(12) United States Patent
Graham et al.

(10) Patent No.: US 8,902,488 B2
(45) Date of Patent: Dec. 2, 2014

(54) SYSTEM ARCHITECTURE FOR AN OPTICAL SWITCH USING WAVELENGTH, FIBER AND POLARIZATON ADDRESSING

(75) Inventors: David Jeffrey Graham, Sewickley, PA (US); David Markham Drury, Pittsburgh, PA (US); Eric John Helmsen, Wexford, PA (US)

(73) Assignee: Accipiter Systems, Inc., Wexford, PA (US)

( * ) Notice: Subject to any disclaimer, the term of this patent is extended or adjusted under 35 U.S.C. 154(b) by 0 days.

(21) Appl. No.: 13/535,893

(22) Filed: Jun. 28, 2012

(65) Prior Publication Data

US 2014/0002885 A1   Jan. 2, 2014

(51) Int. Cl.
G02F 1/01 (2006.01)
G02F 1/09 (2006.01)

(52) U.S. Cl.
USPC .............................. 359/276; 359/281; 359/284

(58) Field of Classification Search
USPC ......... 359/276, 281, 284, 303, 341.3, 487.04, 359/484.06; 385/14, 15, 16
See application file for complete search history.

(56) References Cited

U.S. PATENT DOCUMENTS

| | | | |
|---|---|---|---|
| 5,319,642 A | 6/1994 | Ota | |
| 6,477,294 B1 | 11/2002 | Jansen Van Doorn et al. | |
| 6,480,644 B1 * | 11/2002 | MacDonald | 385/16 |
| 6,738,582 B1 | 5/2004 | Moshe et al. | |
| 7,042,883 B2 | 5/2006 | Fan et al. | |
| 7,050,663 B2 | 5/2006 | Nikonov et al. | |
| 7,272,309 B1 | 9/2007 | Tamil et al. | |
| 7,289,439 B2 | 10/2007 | Lee et al. | |
| 7,349,629 B1 | 3/2008 | Soderberg et al. | |
| 7,751,709 B2 | 7/2010 | Drury et al. | |
| 7,889,723 B2 | 2/2011 | Beshai et al. | |
| 8,218,965 B1 | 7/2012 | Uhlhorn et al. | |
| 8,369,706 B2 | 2/2013 | Sorin | |
| 2002/0131441 A1 | 9/2002 | Trachewsky et al. | |
| 2002/0154357 A1 | 10/2002 | Ozveren et al. | |
| 2003/0063348 A1 | 4/2003 | Posey et al. | |
| 2003/0185229 A1 | 10/2003 | Shachar et al. | |
| 2004/0037301 A1 | 2/2004 | Shachar et al. | |

(Continued)

FOREIGN PATENT DOCUMENTS

WO   2005125264 A1   12/2005

OTHER PUBLICATIONS

Cotter et al., "Asynchronous Digital Optical Regeneration and Networks", Dec. 1998, Journal of Lightwave Technology. 16(12):2068-2080.

(Continued)

*Primary Examiner* — Scott J Sugarman
*Assistant Examiner* — Mustak Choudhury
(74) *Attorney, Agent, or Firm* — Pepper Hamilton LLP (57) ABSTRACT

Systems for switching optical signals are disclosed. Such a system may include a splitter and a plurality of polarizing filters. The splitter may be configured to receive emitted light and duplicate the emitted light into a plurality of light copies. Each polarizing filter may have a polarization and may be operably connected to the splitter. In addition, each polarizing filter may be configured to receive at least one of the plurality of light copies, filter the at least one of the plurality of received light copies such that light having a similar polarization as that of the polarizing filter passes through the polarizing filter, and output one of a plurality of outputs.

13 Claims, 4 Drawing Sheets

(56) References Cited

U.S. PATENT DOCUMENTS

| | | | |
|---|---|---|---|
| 2004/0076434 | A1 | 4/2004 | Whittaker et al. |
| 2004/0126057 | A1 | 7/2004 | Yoo |
| 2005/0147411 | A1 | 7/2005 | Hamou et al. |
| 2005/0174639 | A1* | 8/2005 | Zalevsky et al. ............ 359/484 |
| 2005/0207427 | A1 | 9/2005 | Su et al. |
| 2005/0213995 | A1 | 9/2005 | Lee et al. |
| 2006/0198299 | A1 | 9/2006 | Brzezinski et al. |
| 2006/0257143 | A1 | 11/2006 | Cavazzoni et al. |
| 2007/0110439 | A1 | 5/2007 | Beshai et al. |
| 2007/0121664 | A1 | 5/2007 | Szczebak, Jr. et al. |
| 2007/0242625 | A1 | 10/2007 | Dunne et al. |
| 2007/0285843 | A1* | 12/2007 | Tran ........................... 360/245.9 |
| 2009/0074414 | A1 | 3/2009 | Miles et al. |
| 2009/0232497 | A1 | 9/2009 | Archambault et al. |
| 2009/0304383 | A1 | 12/2009 | Drury |
| 2010/0165997 | A1 | 7/2010 | Matsumoto |
| 2010/0188734 | A1* | 7/2010 | Grudinin et al. ........... 359/341.3 |
| 2010/0296812 | A1 | 11/2010 | Asghari |
| 2011/0008043 | A1 | 1/2011 | Nomura et al. |
| 2012/0033968 | A1 | 2/2012 | Testa et al. |
| 2012/0128354 | A1 | 5/2012 | Panwar et al. |
| 2012/0293856 | A1* | 11/2012 | Onaka ........................... 359/276 |
| 2013/0089322 | A1 | 4/2013 | Ohlen |

OTHER PUBLICATIONS

Guillemot et al., "Transparent Optical Packet Switching: The European ACTS KEOPS Project Approach", Dec. 1998, Journal Lightwave Technology. 16(12):2117-2134.

Hunter et al., "SLOB: A Switch with Large Optical Buffers for Packet Switching", Oct. 1998, J. Lightwave Technology 16(10):1725-1736.

Hunter et al., "WASPNET: A Wavelength Switched Packet Network", Mar. 1999, IEEE Communications Magazine pp. 120-129.

Wonglumsom et al., "Hornet—A Packet-Switched WDM Network: Optical Packet Transmission and Recovery", Dec. 1999, IEEE Photonics Technology Letters 11(12):1692-1694.

Carena et al., "OPERA: An Optical Packet Experimental Routing Architecture with Label Swapping Capability," Dec. 1998, J. Lightwave Technology 16(12):2135-2145.

Masetti et al., "High Speed, High Capacity ATM Optical Switches for Future Telecommunication Transport Networks", Jun. 1996, IEEE Journal Selected Areas in Communications 14(5):979-998.

Chiaroni et al., "Physical and Logical Validation of a Network Based on All-Optical Packet Switching Systems", Dec. 1998, Journal Lightwave Technology 16(12):2255-2264.

Hunter et al., "Approaches to Optical Internet Packet Switching", Sep. 2000, IEEE Communications Magazine pp. 116-122.

Vaughn et al., "All-Optical Updating of Subcarrier Encoded Packet Headers with Simultaneous Wavelength Conversion of Baseband Payload in Semiconductor Optical Amplifiers", 1997, IEEE Photonics Technology Letters 9(6):827-829.

Chlamtac et al., "CORD: Contention Resolution by Delay Lines", Jun. 1996, IEEE Journal on Selected Areas in Communications 14(5):1014-1029.

Hunter et al., "Buffering in Optical Packet Switches", Dec. 1998, Journal Lightwave Technology 16(12):2081-2094.

Yao et al., "Advances in Photonic Packet-Switching: An Overview", Feb. 2000, IEEE Communications Magazine pp. 84-93.

Qiao et al., "Optical Burst Switching (OBS)—A New Paradigm for an Optical Internet", Mar. 1999, in a special issue of J. High Speed Networks (JHSN) on WDM Networks, vol. 8(1):69-84.

Yoo et al., "A High Speed Protocol for Bursty Traffic in Optical Networks", SPIE's All-Optical Communication Systems: Architecture, Control and Protocol Issues, vol. 3230:79-90.

Dolzer et al., "Evaluation of Reservation Mechanisms for Optical Burst Switching", Jan. 2001, AEU International Journal Electronics and Communications, 55(1).

Chaskar, et al., "A Framework to Support IP over WDM Using Optical Burst Switching", Jan. 2000, Journal on Selected Areas in Communication, pp. 1-10.

Yoo et al., "Optical Burst Switching for Service Differentiation in the Next-Generation Optical Internet", Feb. 2001, IEEE Communications Magazine, pp. 98-104.

Qiao, "Labeled Optical Burst Switching for IP-over-WDM Integration", Sep. 2000, IEEE Communications Magazine pp. 104-114.

Yoo et al., "The Effect of Limited Fiber Delay Lines on QoS Performance of Optical Burst Switched WDM Networks", Jun. 2000, International Conference on Communication ICC, pp. 974-979.

Huang et al., "Dynamically reconfigurable optical packet switch (DROPS)", Dec. 2006, Optics Express, 14(25), pp. 12008-12014.

\* cited by examiner

SYSTEM ARCHITECTURE FOR AN OPTICAL SWITCH USING WAVELENGTH, FIBER AND POLARIZATON ADDRESSING

BACKGROUND

The disclosed embodiments generally relate to the fields of optical networks, data switching and data routing. More specifically, the disclosed embodiments generally relate to an optical switch for switching incoming data to a specific output.

Recently, telecommunication systems and data networking systems have rapidly grown in speed and capacity. Accompanying the growth of these systems, however, has been the cost of maintaining these systems. A typical network, such as a local area network (LAN), requires a large and costly infrastructure. For example, groups of servers must be included in the LAN to handle requests from users of the LAN, direct these requests accordingly, maintain various shared files and other resources, and provide a gateway to other networks, e.g., the Internet. In addition to the servers, each LAN must have a series of routers and switches to direct traffic generated by the users of the LAN. The servers, switches and routers, as well as the users' computers must all be connected via cabling or a wireless connection. These various devices and connections all require significant power, cooling, space and financial resources to ensure proper functionality.

Fiber optic cables have been used to replace standard coaxial or copper based connections in communication networks. Fiber optic cables typically use glass or plastic optical fibers to propagate light through a network. Specialized transmitters and receivers utilize the propagated light to send data through the fiber optic cables from one device to another. Fiber optic cables are especially advantageous for long-distance communications, because light propagates through the fibers with little attenuation as compared to electrical cables. This allows long distances to be spanned with few repeaters, thereby reducing the cost of a communication network.

In fiber-optic communications, wavelength-division multiplexing (WDM) is a technology that multiplexes multiple optical carrier signals on a single optical fiber by using different wavelengths of light to carry different signals. WDM allows for a multiplication in capacity. A WDM system typically uses a multiplexer to join multiple optical carrier signals together at a transmitter, and a demultiplexer at the receiver to split the multiplexed signal into its original optical carrier signals.

As both communication systems grow and fiber optic systems become more integrated into standard communications, the speed, and resultant cost, of individual network components is also growing. Huge investments must be made by telecommunication companies to keep up with consumer demand as well as technological developments. However, there is an unmet desire to design a data center having a single large, high capacity and low latency data fabric that joins all elements in the data center, e.g., processors, storage devices, network communication elements, and other similar components in a flexible and virtualized manner.

Prior art approaches at increasing the capacity of a data center generally require data routing at the network core, resulting in buffering (and inherent latency) to queue the data flows at the core. Alternatively, prior art approaches have eliminated some switching functions by establishing direct, out-of-band connections. However, these arrangements typically use electrical components which are not scaling in speed or performance at a similar rate to the devices the components are interconnecting, thereby limiting the overall performance of the data center.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In an embodiment, a system for switching optical signals may include a splitter configured to receive emitted light and duplicate the emitted light into a plurality of light copies, and a plurality of polarizing filters. Each polarizing filter is operably connected to the splitter and is configured to receive at least one of the plurality of light copies, filter the at least one of the plurality of received light copies such that light having a similar polarization as that of the polarizing filter passes through the polarizing filter, and output one of a plurality of outputs.

In an embodiment, a system for switching optical signals may include a light emitting device configured to emit light at a plurality of polarizations, a splitter configured to duplicate the emitted light into a plurality of light copies, and a plurality of polarizing filters. Each polarizing filter is operably connected to the splitter and is configured to receive at least one of the plurality of light copies, filter the at least one of the plurality of received light copies such that light having a similar polarization as that of the polarizing filter passes through the polarizing filter, and output one of a plurality of outputs.

In an embodiment, a system for switching optical signals may include a control plane processor, a splitter configured to receive emitted light and duplicate the emitted light into a plurality of light copies, and a plurality of silicon optical amplifiers (SOAs) operably connected to the splitter and configured to receive at least one of the plurality of light copies. Each of the plurality of SOAs may be configured to turn on or off in response to an instruction from the control plane processor such that the emitted light is switched to an appropriate end device operably connected to one of the plurality of SOAs.

DETAILED DESCRIPTION

The following terms shall have, for the purposes of this application, the respective meanings set forth below.

An "end device" is a network component that is configured to transmit and/or receive information over the network. End devices may be components that end users interact with to access the network, including, but not limited to, computers and workstations. An end device may also be a component that an end user does not directly interact with, including, but not limited to, email servers and web servers. An end device may include one or more end device interfaces for operably connecting to the network. An end device interface may use any common network interface standard, including, but not limited to, Ethernet, Fiber Channel, PCI Express, Infiniband and other common network interface standards.

A "switch" refers to a network component that provides bridging and/or switching functionality between a plurality of end devices. A switch may have a plurality of inputs and a corresponding number of outputs. Each end device may be operably connected to a switch via an input cable and an output cable. The cable type may include, but is not limited to, copper, multimode fiber and single mode fiber. Alternatively, the end device may be operably connected to a switch via an embedded switch port device integrated into the end device.

A "switch port device" refers to a network component that accepts inputs from end devices and provides outputs to end devices. Based upon information contained in incoming data or with the intended destination for traffic from that input port established through switch management action, the switch port device encodes the data so as to be switched by the optical core to reach a destination switch port device to which a destination end device is operably connected. For example, a switch port device may transmit to one or more destination switch port devices by varying the wavelength of its transmissions to match a wavelength at which its burst is switched to a specific destination end device. A switch port device may be implemented as an embedded unit within an end device, as a separate element or as a line card in a switch.

An "Optical Burst" (OB) network refers to a network constructed from a plurality of end devices and one or more switches. An OB network uses optical transmissions within the switch to send data bursts between a source switch port device and one or more destination switch port devices.

An "optical core" refers to a network core configured to direct light signals to one or more specific output ports.

A "control plane processor" refers to a processing device configured to receive information about data streams that are arriving at one or more switch port devices and/or from a management path. The control plane processor may be configured to grant permission to one or more switch port devices to transmit specific data streams over the optical core at a specific time or times. Additional detail and examples related to an optical core and control plane processors is shown in U.S. application Ser. No. 13/276,805 filed Oct. 19, 2011 and titled "Optical Switch for Networks Using Wavelength Division Multiplexing," and U.S. application Ser. No. 13/372,716 filed Feb. 14, 2012 and titled "System Architecture for Optical Switch Using Wavelength Division Multiplexing," the contents of which are both hereby incorporated by reference in their entirety.

An OB network typically removes layers of conventional infrastructure equipment, thus reducing latency and increasing bandwidth. Moreover, power, cooling and packaging costs are dramatically reduced as a result of the reduction in physical infrastructure. In addition, an OB network is easily scalable and can benefit from increases in optical technologies for improved bandwidth over time. An OB network is inherently transparent to the content of the data encoded on the bursts carried over it, and may be designed to carry Ethernet traffic by providing Ethernet interfaces to connected computer systems, PCI Express traffic through PCI Express interfaces, Fiber Channel through Fiber Channel interfaces, and so forth. OB networks and methods of using OB networks to reduce network costs by interfacing various computer systems via an optical switch are discussed below with reference to the figures.

An illustrative OB network as discussed herein may include at least four basic elements: a plurality of end devices, at least one switching device, which includes a plurality of switch port devices and at least one optical core, and a plurality of optical fibers linking the switch port devices to the optical core(s). Each switch port device may include one or more transceivers used to access the optical fibers to the core. An optical transceiver may be an integrated circuit configured to transmit and receive a signal via an optical fiber. An optical fiber is typically a glass or plastic tube configured to carry an optical signal. In the exemplary OB network as discussed herein, an optical fiber (single-mode or multi-mode) may be used to link each node to the switching device, thereby establishing a network, such as a LAN.

Figure 1:
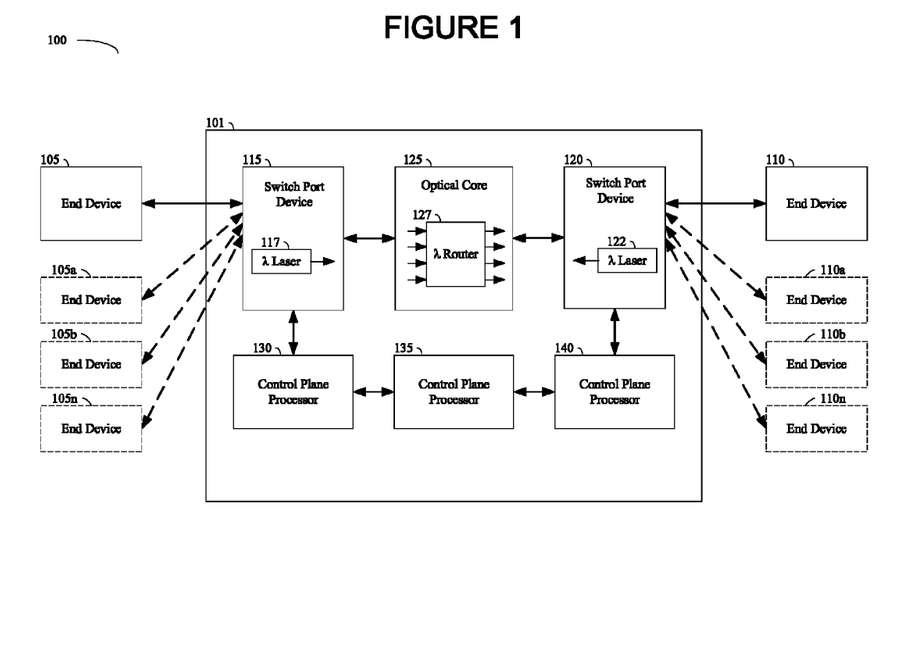
FIG. 1 shows an illustrative network containing a switch including a switch port device and Optical Core according to an embodiment.

FIG. 1 shows an illustrative system level diagram of an exemplary OB network 100. The OB network 100 may include a plurality of end devices 105, 105a, 105b to 105n, 110, 110a, and 110b to 110n interconnected by a switch 101. The interconnects can include, but are not limited to, copper, single-mode and multi-mode fibers. Each end device may be connected to both an input terminal and an output terminal of the switch 101.

In order for one end device to transmit data to another end device, the source end device transmits data to the switch 101 with the intended destination information contained within the data stream or with the intended destination for traffic from that input port established through switch management action. For example, end device 105 may send a packet of data intended for end device 110. The end device 105 may transmit the packet to switch 101. The switch 101 may receive the data and direct the data to the output destination end device 110 accordingly. The internal architecture of the switch 101 is discussed in greater detail below.

Each of the end devices 105 and 110 may be operably connected to one of switch port device 115 and switch port device 120, respectively. Each switch port device 115 and 120 may be configured to receive incoming data from an end device, determine the destination of the data (e.g., one of end devices 105, 105a, 105b to 105n, 110, 110a, 110b to 110n), and direct the data such that the optical burst reaches the intended destination switch port device(s), where the burst is reformatted into data for transmission to the appropriate end device(s).

Each of the switch port devices 115 and 120 may be operably connected to an optical core 125 and one or more control plane processors 130, 135 and 140. The optical core 125, in combination with the control plane processors 130, 135 and 140, may be configured to switch and direct data bursts based upon one or more of their optical properties. For example, optical core 125, in combination with the control plane processors 130, 135 and 140, may be configured to switch and direct data bursts based upon the wavelength of the optical bursts. An example of an optical core using a wavelength-based addressing scheme is shown in U.S. patent application Ser. No. 13/035,045 filed Feb. 25, 2011 and titled "Optical Switch for Implementing Wave Division Multiplexing Networks," the content of which is hereby incorporated by reference in its entirety. The control plane processors 130, 135 and 140 may be configured to control data flow from the switch port devices 115 and 120 to the optical core 125. The control plane processors 130, 135 and 140 may schedule transmissions over the optical core such that only one burst is being sent to any specific destination at one time, thereby eliminating the chances of two or more bursts colliding when attempting to reach the same destination, and the contents of the bursts being lost during transmission.

It should be noted that three control plane processors 130, 135 and 140 are shown by way of example only. In an alternative embodiment, a single control plane processor may be used to control data flow through the optical core. The number of control plane processors may be determined by the layout of the OB network as well as the amount of traffic and related information to be processed, and thus may vary depending on the application and design of the network.

In the embodiment described above, the number of switch port devices that can be separately addressed is determined by the number of different wavelengths that the OB transceiver 117 or 122 can produce as well as the number of inputs available at a wavelength router 127. Whichever number is smaller determines the number of switch port device that can be separately addressed in the switch 101.

However, additional addressing schemes beyond a wavelength-based addressing scheme may be used. For example, the optical core 125, in combination with the control plane processors 130, 135 and 140, may be configured to switch and direct data bursts based upon additional optical properties of the optical bursts such as polarization. Additionally, optical space switches may be used to provide an additional address scheme. Each of these schemes may function independently or in combination to extend the overall addressing scheme.

Figure 2:
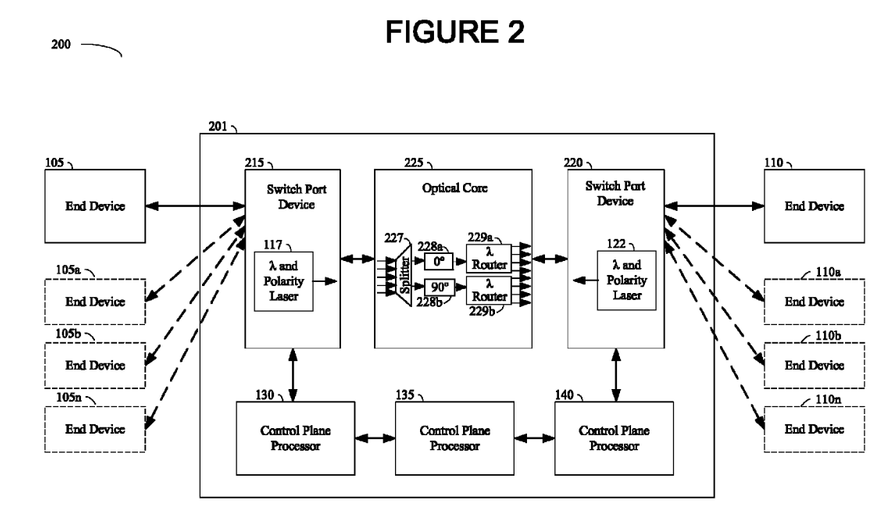
FIG. 2 shows an alternative network including a switch port device and Optical Core according to an embodiment.

FIG. 2 illustrates an exemplary network 200 architecture incorporating a switch 201 using a polarizing optical addressing scheme in addition to a wavelength addressing scheme. A light emitting device, such as polarity selectable variable wavelength OB Transceiver 117, may be integrated into a switch port device 215 and configured to create, modulate and emit a light of a specific wavelength at a specific polarization. Similarly, a polarity selectable variable wavelength OB Transceiver 122 may be integrated into a switch port device 120.

The emitted light may propagate down an optical fiber to an optical core 225 that contains an optical splitter 227. The optical splitter 227 may duplicate the light into two or more copies and forward each of the copies to a polarizer element, such as 228a and 228b. As shown in FIG. 2, a copy of the split light may propagate to 0° polarizing filter 228a. Similarly, a copy of the split light may propagate to 90° polarizing filter 228b, which is also a part of the optical core 225. Additional and/or alternate optical splitters that split light into more than 2 copies and/or to different polarizations may be used within the scope of this disclosure.

The polarizing filter 228a may be operably connected to a wavelength router 229a, which is configured to use the wavelength of any filtered light to select an output port. Similarly, the polarizing filter 228b may be operably connected to a wavelength router 229b, which is also configured to use the wavelength of any filtered light to select an output port.

Depending on the initial polarization of the light as emitted by the polarity selectable OB Transceiver 117, the light can be propagated to a specific destination based upon the polarization as well as the wavelength. For example, as shown in FIG. 2, the polarity selectable OB Transceiver 117 may be configured to produce light having either a 0° or a 90° polarization. The optical splitter 227 may be operably connected to the two optical polarizing filters 228a and 228b in orthogonal rotations at each end. It should be noted that 0° and 90° polarizations are shown by way of example only. Alternate polarization groups, such as 0° and 180° or 0°, 45° and 90°, may be used within the scope of this disclosure.

In one example of operation of the network 200, the polarity selectable OB Transceiver 117 may emit a light having a specific polarization (e.g., 90°). The modulated light is duplicated at the splitter 227, but only the signal with the like polarization would pass through the filters. Thus, in this example, 90° polarizing filter 228b would emit the signal while 0° polarizing filter 228a would not emit any light. In this way, a 1-to-2 optical switch may be created where each of the outputs has a unique polarization.

It should be noted that switching components as shown in FIG. 2 may be actively or passively implemented. Additionally, two polarizing filters are shown by way of example only. The number of polarizing filters may be increased accordingly depending on the functionality of the polarity selectable laser. For example, if the polarity selectable OB Transceiver is configured to produce 5 potential polarizations (e.g., 0°, 45°, 90°, 135° and 180°, five polarizing filters may be used, thereby resulting in a 1-to-5 optical switch.

Similarly, it should be noted that the separate splitter and filter arrangement as shown in FIG. 2 is by way of example only. The splitter may be modified such that the filters are integrated into the splitter, thereby reducing the number of overall components and simplifying the optical core design.

Figure 3:
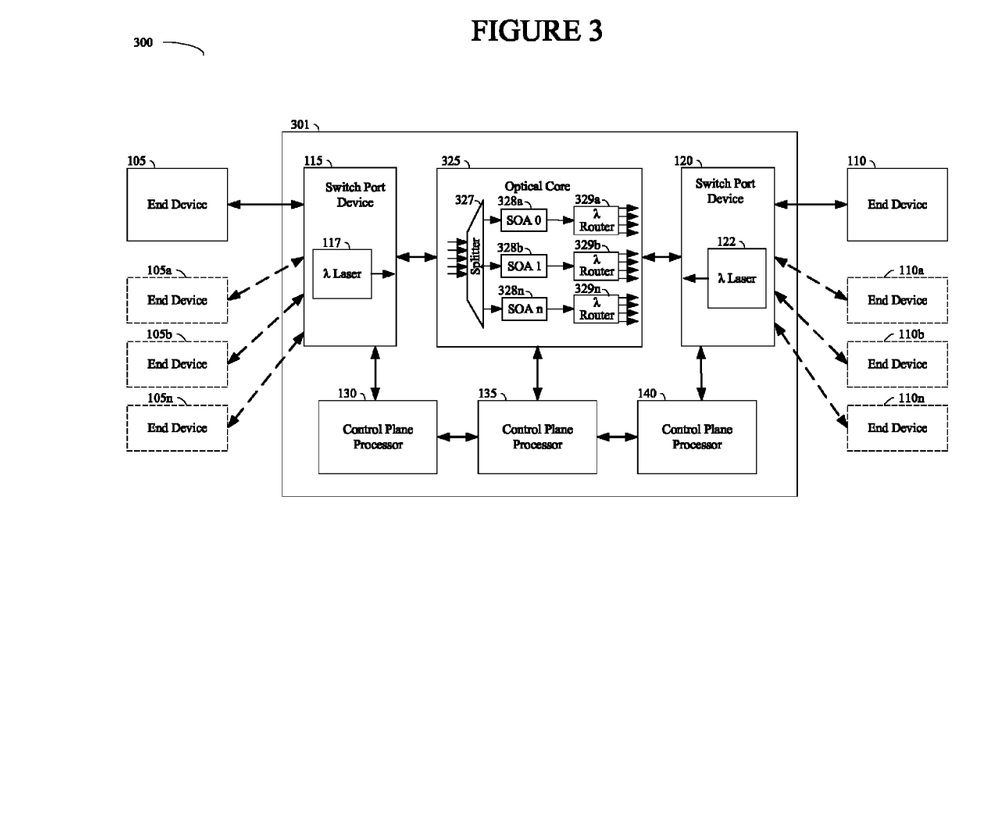
FIG. 3 shows an alternative network including a switch port device and Optical Core according to an embodiment.

FIG. 3 illustrates an exemplary network 300 architecture incorporating a switch 301 using an optical fiber addressing scheme and an optical switch. A light emitting device such as an OB Transceiver 117 may create, modulate and emit a light of a specific wavelength including data intended for a specific destination address. The emitted light may propagate to an optical core 325. Within the optical core 325, the light may propagate to a splitter 327. The splitter 327 may duplicate the light into multiple copies and forward each of the copies to one of a bank of silicon optical amplifiers (SOA) 328a-328n. An SOA is a silicon based component configured to amplify an optical signal directly, without the need to first convert the optical signal to an electric signal. If an SOA is in an off state, the SOA blocks further transmission of an optical signal.

As shown in FIG. 3, a copy of the split light may propagate down SOA 0 328a. Similarly, a copy of the split light may propagate to SOA 1 328b. This process may continue based upon the number of SOAs in the bank until a copy of the emitted light is propagated to SOA n 328n. It should be noted that the copied light may be propagated to each of the SOAs simultaneously, and the timing order as discussed above is only for purposes of illustration.

Each of the SOAs may be further connected to a wavelength router. As shown in FIG. 3, SOA 0 328a is operably connected to wavelength router 329a, SOA 1 328b is operably connected to wavelength router 329b, and SOA n 328n is operably connected to wavelength router 329n.

Each of the SOAs may be associated with a specific wavelength selectable group of destination addresses and operably connected to an end device associated within that group of destination addresses. For example, each of end devices 110, 110a, 110b and 110n may be operably connected to a unique SOA associated with their individual destination addresses. As each optical burst is switched, an appropriate SOA is turned on, and the copy of the emitted light received by that SOA is transferred past the SOA to the destination address.

For example, SOA 0 328a may be associated with and operably connected to end device 110. The OB Transceiver 117 may emit an optical burst intended for the end device 110.

Prior to transmission, a control plane processor 130 may receive an indication that the OB Transceiver 117 has an optical burst intended for end device 110. The control plane processor 130 may schedule a time for the OB Transceiver 117 to transmit the optical burst. At the scheduled time, when the OB Transceiver 117 is transmitting the optical burst intended for end device 110, the control plane processor 130 may send an indication to the SOA bank that all SOAs, except SOA 0 328a, should be turned off. The splitter 327 may receive the optical burst, duplicate the optical burst, and forward the optical burst to each of the SOAs. Each of the SOAs that are turned off (e.g., SOA 1 328b and SOA n 328n as shown in FIG. 3) will block the optical burst. In contrast, the SOA that is turned on (i.e., SOA 0 328a as shown in FIG. 3) will pass the optical burst to the destination address, thereby switching the optical burst to end device 110. One or more of the control plane processors 130, 135 and 140 may coordinate the on/off state of the SOAs. For example, control plane processor 135 may be configured to control the state of the SOAs.

It should be noted that the separate splitter and SOA arrangement as shown in FIG. 3 is by way of example only. The splitter may be modified such that the SOAs are integrated into the splitter, thereby reducing the number of overall components and simplifying the Optical Core design.

It should be noted that the use of SOAs as the switching elements is by way of example and that any other optical switching technology that is capable of satisfying the switching speed requirements may be used within the scope of this disclosure.

Figure 4:
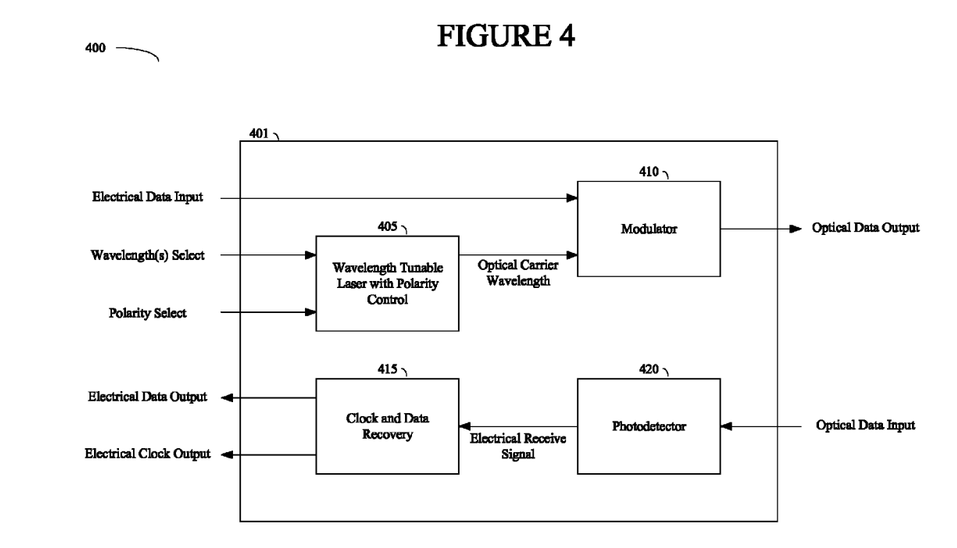
FIG. 4 depicts an illustrative optical burst transceiver for use within the switch port devices of FIGS. 1, 2 and 3 according to an embodiment.

FIG. 4 illustrates an exemplary OB Transceiver 401. As shown in FIG. 4, the OB Transceiver 401 may contain a Wavelength Tunable Laser with Polarity Control 405, a Modulator 410, a Photodetector 420 and a Clock and Data Recovery Module 415. Electrical Data for transmission may be operably connected to the Modulator 410. Wavelength(s) Select and Polarity Select signals may be operably connected to the Wavelength Tunable Laser with Polarity Control 405, the output of which is operable connected to the Modulator 410 and identifies an Optical Carrier Wavelength. The Modulator 410 modulates the Electrical Data onto the Optical Carrier Wavelength to create the polarity controlled Optical Data Output.

The Optical Data Input is operably connected to the Photodetector 420, which decodes the Optical Data and generates an Electrical Receive Signal output. The Electrical Receive Signal output is operably connected to the Clock and Data Recovery Module 415, which generates an Electrical Data Output and an Electrical Clock Output.

It should also be noted that the switches as shown above may be modified accordingly based upon the requirements of a network that the switches are integrated into. Additionally, the switches may be modified accordingly to compensate for any losses in signal quality associated with the individual components used to construct the switch. For example, a switch may further include an amplifier for increasing the output power of each of the outputs. In such an embodiment, the switch may further require a power source in order to provide power for the amplifier.

It should also be noted that while the disclosed embodiments refer to switch data operating with Ethernet, the switches may also be used with alternate and/or additional networking protocols. For example, a switch may be integrated into an InfiniBand network, a Fibre Channel network, or another similar switched fabric network protocol configured to transfer data between end devices.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A system for switching optical signals, the system comprising:
   a passive splitter configured to receive modulated, emitted light and duplicate the modulated, emitted light into a plurality of light copies; and
   a plurality of passive polarizing filters, wherein each passive polarizing filter is operably connected to the splitter and is configured to receive at least one of the plurality of light copies, filter the at least one of the plurality of received light copies such that light having a similar polarization as that of the passive polarizing filter passes through the passive polarizing filter, and output one of a plurality of outputs,
   wherein each of the passive polarizing filters has a unique associated polarity, and
   wherein the plurality of passive polarizing filters is equal in number to a plurality of polarizations of the modulated, emitted light received by the passive splitter.

2. The system of claim 1, wherein each of the plurality of passive polarizing filters is further configured to block light having a dissimilar polarization.

3. The system of claim 1, wherein each of the outputs has a unique polarization.

4. A system for switching optical signals, the system comprising:
   a light emitting device configured to emit light at a plurality of polarizations and modulate the light to one of the plurality of polarizations, wherein the light emitting device is a polarity selectable optical burst transceiver;
   a passive splitter configured to duplicate the emitted light into a plurality of light copies; and
   a plurality of passive polarizing filters, wherein each passive polarizing filter is operably connected to the splitter and is configured to receive at least one of the plurality of light copies, filter the at least one of the plurality of received light copies such that light having a similar polarization as that of the passive polarizing filter passes through the passive polarizing filter, and output one of a plurality of outputs, wherein the plurality of passive polarizing filters is equal in number to the plurality of polarizations modulated by the light emitting device.

5. The system of claim 4, wherein each passive polarizing filter has a unique associated polarity.

6. The system of claim 4, wherein each passive polarizing filter is further configured to block light having a dissimilar polarization.

7. The system of claim 4, wherein each of the outputs has a unique polarization.

8. A system for switching optical signals, the system comprising:
   a control plane processor;
   a passive splitter configured to receive modulated, emitted light and duplicate the modulated, emitted light into a plurality of light copies; and
   a plurality of silicon optical amplifiers (SOAs) operably connected to the splitter and configured to receive at least one of the plurality of light copies, wherein each of the plurality of SOAs is configured to turn on or off in response to an instruction from the control plane processor such that the emitted light is switched to an appropriate end device operably connected to one of the plurality of SOAs, wherein each of the plurality of SOAs is associated with a unique destination address, wherein the plurality of SOAs is equal in number to a plurality of polarizations of the modulated, emitted light received by the passive splitter.

9. The switch of claim 8, further comprising a light emitting device configured to emit light intended for an end device.

10. The switch of claim 9, wherein the light emitting device is further configured to receive a scheduled time from the control plane processor and emit the light at the scheduled time.

11. The switch of claim 8, wherein each unique destination address is associated with an output in operable communication with an end device.

12. A system for switching optical signals, the system comprising:
- a light emitting device configured to emit light at a plurality of polarizations and modulate the light to one of the plurality of polarizations;
- a passive splitter configured to duplicate the emitted light into a plurality of light copies; and
- a plurality of passive polarizing filters, wherein each passive polarizing filter is operably connected to the splitter and is configured to receive at least one of the plurality of light copies, filter the at least one of the plurality of received light copies such that light having a similar polarization as that of the passive polarizing filter passes through the passive polarizing filter, and output one of a plurality of outputs,
- wherein each passive polarizing filter has a unique associated polarity, and
- wherein the plurality of passive polarizing filters is equal in number to the plurality of polarizations modulated by the light emitting device.

13. A system for switching optical signals, the system comprising:
- a light emitting device configured to emit light at a plurality of polarizations and to modulate the light to one of the plurality of polarizations;
- a passive splitter configured to duplicate the emitted light into a plurality of light copies; and
- a plurality of passive polarizing filters, wherein each passive polarizing filter is operably connected to the splitter and is configured to receive at least one of the plurality of light copies, filter the at least one of the plurality of received light copies such that light having a similar polarization as that of the passive polarizing filter passes through the passive polarizing filter, and output one of a plurality of outputs,
- wherein the plurality of passive polarizing filters is equal in number to the plurality of polarizations modulated by the light emitting device.

* * * * *